United States Patent [19]

Mahoney

[11] Patent Number: 5,234,092
[45] Date of Patent: Aug. 10, 1993

[54] CONTROL VALVE ASSEMBLY WITH CONCENTRIC SPOOLS

[75] Inventor: John E. Mahoney, Bloomfield Hills, Mich.

[73] Assignee: General Motors Corporation, Detroit, Mich.

[21] Appl. No.: 943,098

[22] Filed: Sep. 10, 1992

[51] Int. Cl.⁵ .............................................. F16D 25/11
[52] U.S. Cl. ................................. 192/87.13; 192/87.1
[58] Field of Search .................. 192/87.1, 87.11, 87.13

[56] References Cited

U.S. PATENT DOCUMENTS 4,890,636  1/1990  Higuchi ........................ 192/87.13 X
5,115,722  5/1992  Ichihashi et al. ............ 192/87.13 X Primary Examiner—Richard M. Lorence
Attorney, Agent, or Firm—Donald F. Scherer

[57] ABSTRACT

A control valve mechanism has concentric spool valve members that are selectively positionable to provide control pressure. The control pressure may be used for the selective actuation of fluid operated friction torque transmitting devices, such as clutches and brakes, in a power transmission.

5 Claims, 1 Drawing Sheet

CONTROL VALVE ASSEMBLY WITH CONCENTRIC SPOOLS

BACKGROUND OF THE INVENTION

This invention relates to hydraulic control mechanisms, and more particularly, to hydraulic control mechanisms having a plurality of spool valve members. Specifically, this invention relates to hydraulic control mechanisms having spool valves for establishing the working condition of the fluid operated friction torque transmitting devices.

The clutch and brake control valves or shift valves of the spool type currently used in power transmissions are slidably disposed in a valve body. The valve body has a bore for each valve member.

SUMMARY OF THE INVENTION

The present invention provides for the installation of two shift valves in one bore. This is accomplished by slidably housing one valve spool in a longitudinal bore in the valve body while the second valve spool is slidably disposed within a longitudinal bore in the one spool valve. The outer spool valve has porting structure which is operable to supply fluid pressure to the inner spool valve and to direct the control pressure from the inner spool valve to the device to be controlled. This will reduce the overall area or footprint between the valve body and the transmission casing.

It is an object of this invention to provide an improved control valve assembly for fluid operated friction torque transmitting devices.

It is another object of this invention to provide an improved control valve mechanism for fluid operated torque transmitting means, wherein two spool valves are concentrically mounted in a valve bore, and wherein one spool valve is slidably disposed within the other.

These and other objects and advantages of the present invention will be more apparent from the following description and drawings.

DESCRIPTION OF THE EMBODIMENTS

Figure 1:
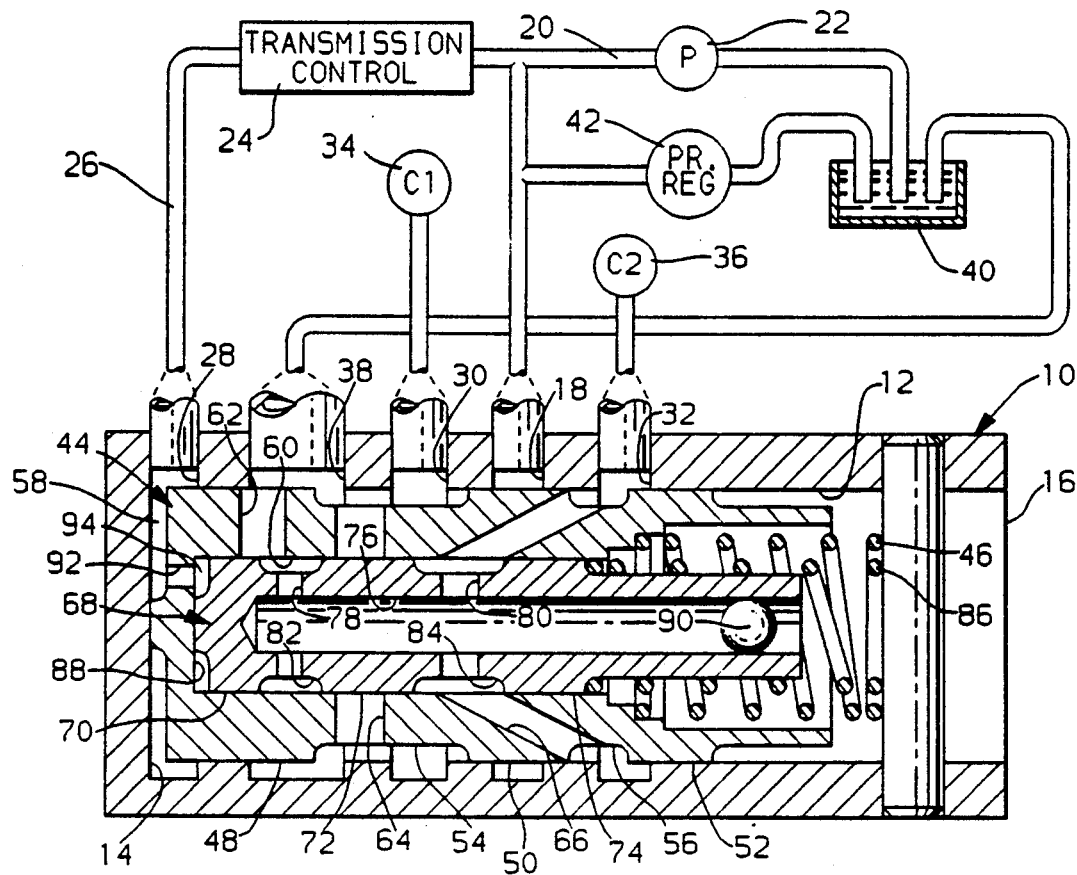
FIG. 1 is a diagrammatic representation of a valve mechanism incorporating the present invention.

Referring to the drawings, wherein like characters represent the same or corresponding parts throughout the several views, there is seen in FIG. 1 a valve housing 10 having a longitudinal valve bore 12 which is closed at a first end 14 and open at a second end 16. The valve housing 10 has a plurality of fluid ports which communicate with valve bore 12. A first port 18 is in fluid communication with the main pressure passage 20 which is connected to receive pressurized fluid from a pressure source, such as a pump 22. The main passage 20 is also connected to a conventional transmission control mechanism 24, which in turn has a control passage 26 connected to a second port 28 of the valve housing 10.

A pair of clutch ports 30 and 32 are connected to to conventional fluid operated clutches 34 and 36, respectively. The valve housing 10 also has connected therewith an exhaust port 38 which is in fluid communication with a transmission sump 40. The fluid in the main passage 20 delivered by the pump 22 has a pressure level controlled by a conventional pressure regulator 42.

The valve bore 12 of valve housing 10 has slidably disposed therein a valve spool 44 which is urged to the closed end of valve bore 12 by a control spring 46. The valve spool 44 has three equal diameter lands 48, 50 and 52. The lands 48 and 50 are separated by a valley 54 while the valve lands 50 and 52 are separated by a valley 56.

In the spring set position shown, the valve spool 44 is operable to connect port 38 with port 30 such that the clutch 34 is exhausted and therefore conditioned for disengaged operation. The valve spool 44 cooperates with the closed end 14 to form a control chamber 58 which is selectively pressurized in a well known manner by the control passage 26.

As a general rule, the fluid pressure in the control passage 26 and therefore chamber 58 is established to be proportional to various vehicle operating parameters, such as throttle setting and vehicle speed. At a predetermined pressure level, the fluid pressure in chamber 58 will be sufficient to cause the valve spool 44 to move rightward against the spring 46 to achieve a pressure set position. In the pressure set position, the valve land 48 closes the exhaust port 38 from clutch port 30, while substantially simultaneously, the valve land 50 will open the clutch port 30 to the port 18, such that the clutch 34 will be pressurized and thereby conditioned for engagement.

When the valve spool 44 returns to the spring set condition, the clutch 34 will, of course, be exhausted and returned to the disengaged position. The actuation of the fluid operated clutches or brakes is well known, such that a more complete description is not believed to be required at this point, as those skilled in the art will be quite familiar with the operation of these devices.

The valve spool 44 has a central longitudinal bore 60 which is in communication with a port 62 which extends through the valve land 48. The longitudinal bore 60 is also in fluid communication with a port 64 which is connected to valley 54 between the lands 48 and 50, and a port 66 which is connected to the valley 56.

A second valve spool 68 is slidably disposed in the longitudinal bore 60. The valve spool 68 has three equal diameter spaced lands 70, 72 and 74, a central passage 76, a first port 78 and a second port 80. The port 78 provides fluid communication between the central passage 76 and valley 82 between lands 70 and 72, while the port 80 provides fluid communication between the passage 76 and a valley 84 formed between the lands 72 and 74.

The valve spool 68 is urged by a spring 86 to abut with a closed end 88 of the longitudinal bore 60. In the spring set position shown, the valley 82 is in fluid communication with the port 62 and the valley 84 is in fluid communication with the port 66. The passage 76 is closed at one end by a ball 90 which is press fit therein to prevent fluid communication from the passage 76 to the right end of the valve spool 68.

The fluid pressure in passage 76 is dependent upon the position of the valve spool 44 and the position of the valve spool 68. When both valve spools are in the spring set position, the port 78 is in fluid communication with the exhaust port 38 through port 62, thus exhausting the passage 76.

The port 80 is in fluid communication with the clutch 36 through ports 66 and 32, thus exhausting the clutch 36. When the valve spool 44 is moved to the pressure set position, the pressure in passage 76 will not change as long as the valve spool 68 remains in the spring set position. To control movement of the valve spool 68 from the spring set position, a fluid passage 92 is provided in the end of valve spool 44 to a control chamber 94 formed between the valve spool 68 and end 88 of longitudinal bore 60.

Pressure in the control chamber 94 is equal to the pressure in the control chamber 58 and is therefore established by the same operating parameters as described above. At a predetermined pressure level within the chamber 94, the valve spool 68 will move rightward against the spring 86 to provide fluid communication between ports 64 and 78. The port 80 will remain in fluid communication with the port 66.

At this time, the valve spool 44 will also be in the spring set position such that the port 64 will be in fluid communication with port 18 and therefore main pressure passage 20, thus permitting main pressure to be directed to the clutch 36 to provide controlled engagement thereof. If for some reason the valve spool 44 has not been shifted to the pressure set position such that clutch 34 remains exhausted, the clutch 36 will also remain exhausted regardless of the position of the valve spool 68. Thus, the embodiment shown in FIG. 1 maintains that the inner valve spool 68 cannot direct fluid pressure to the clutch control unless the outer spool valve 44 has shifted to the pressure set position.

Figure 2:
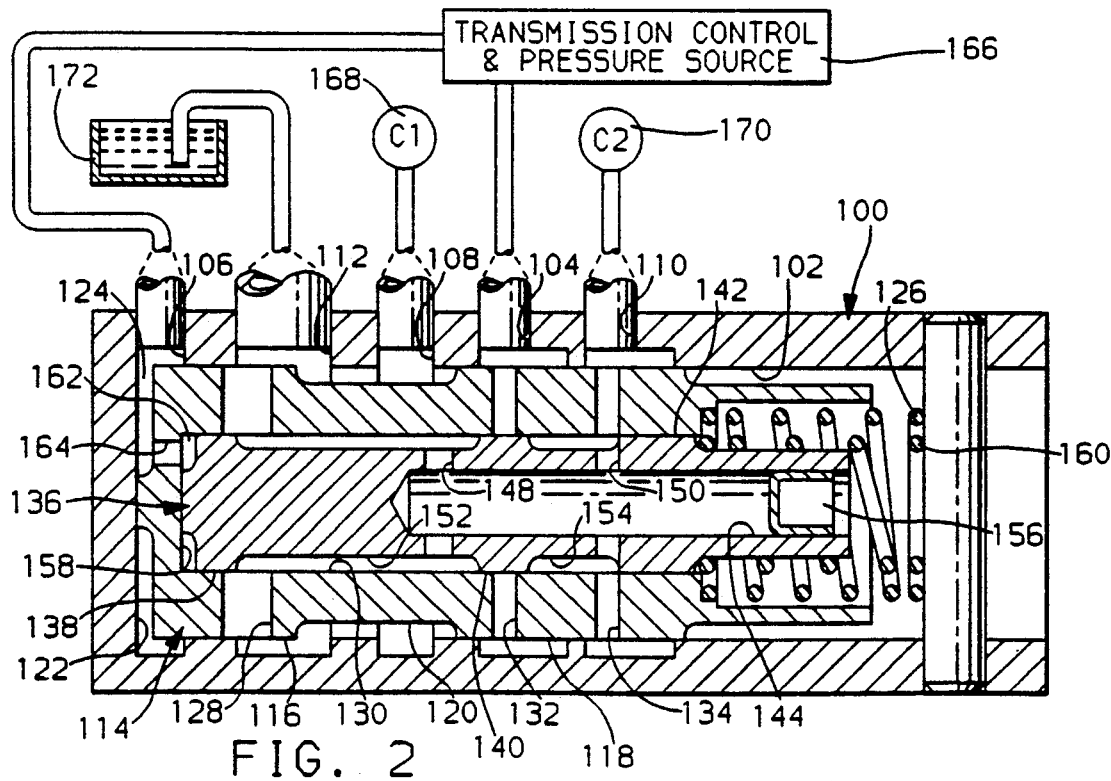
FIG. 2 is a diagrammatic representation of another embodiment of a spool valve mechanism incorporating the present invention.

The embodiment shown in FIG. 2 is similar to that shown in FIG. 1 in that a valve body 100 has formed therein a longitudinal valve bore 102 which has communicating therewith a pressure port 104, a control port 106, a pair of clutch ports 108 and 110, and an exhaust port 112.

A valve spool 114 is slidably disposed in the valve bore 102 and is comprised of a pair of spaced lands 116 and 118 separated by a valley 120. The valve spool 114 cooperates with a closed end 122 of the valve bore 102 to form a control chamber 124. The valve spool 114 is urged toward the end 122 by a spring member 126.

The valve spool 114 has formed therein a first port 128 communicating through land 116 to a longitudinal bore 130, a second port 132 and a third port 134, both of which communicate through valve land 118 with longitudinal bore 130.

An inner valve spool 136 is comprised of three equal diameter spaced lands 138, 140 and 142 which are slidably disposed within the longitudinal bore 130. The valve spool 136 has a central passage 144 which is disposed to interconnect a pair of ports 148 and 150 which communicate with a valley 152 and 154, respectively. The passage 144 is closed at the right end by a plug 156.

The valve spool 136 is urged against a closed end 158 of the bore 130 by a spring member 160. A control chamber 162 is formed between the end 158 and the valve spool 136 and is in fluid communication with the control chamber 124 through a passage 164.

The ports 104 and 106 are in fluid communication with a conventional controlled pressure source 166, the ports 108 and 110 are in fluid communication with fluid operated torque transmitting devices 168 and 170, and the port 112 is in fluid communication with the transmission sump 172.

In the spring set position shown for both valves, the torque transmitting device 168 is exhausted by fluid communication through port 108, valley 120 and port 112. The torque transmitting device 170 is also exhausted through ports 134 and 150, passage 144 and ports 148, 128 and 112.

The port 132 is in fluid communication with the system pressure, however, it is closed to torque transmitting device 168 by the land 118 and to the torque transmitting device 170 by the land 140.

The valve spools 114 and 136 will moved to their pressure set position when the pressure in the control chambers 124 and 162 are pressurized at predetermined pressure levels. For the purpose of discussion, it will be assumed that the valve spool 114 will shift at a lower control pressure than the valve spool 136. When the valve spool 114 is shifted, the exhaust port 112 is closed by land 116 and the pressure port 104 is opened, through valley 120, to permit controlled pressurization of the torque transmitting device 168.

With the valve spool 114 moved to the pressure set position, the port 132 remains in fluid communication with the port 104 and the port 134 remains in fluid communication with the port 110. Likewise, the port 148 remains in fluid communication with the port 128 and to the exhaust port 112.

When the fluid pressure in control chamber 162 is sufficient, the valve spool 136 will be moved to the pressure set position such that valve land 138 will close the port 128 to the valley 152, and will substantially simultaneously open the port 148 to the port 132, and will maintain fluid communication between the port 150 and port 134. It will be evident in the pressure set position that the torque transmitting device 170 will thus be pressurized by fluid pressure at the port 104.

It should also be appreciated that the torque transmitting device 170 will be pressurized whenever the valve spool 136 is in the pressure set position, regardless of the condition of valve spool 114. When the valve spool 114 is in the spring set position shown and the valve spool 136 is moved to the pressure set position, the valve land 138 will close the port 128 to valley 152, and substantially simultaneously thereto, the port 148 will be open to the pressure port 104 which, as described above, provides pressurization through torque transmitting device 170.

Thus, the embodiment of FIG. 2 permits pressurization of the torque transmitting device 170 regardless of the position of the valve spool 114. Likewise, the torque transmitting device 168 is pressurized by the position of valve spool 114 regardless of the position in valve spool 136.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A control valve assembly controlling first and second friction torque transmitting devices comprising:
   a source of fluid pressure;
   a valve housing having a bore portion disposed in fluid communication with said source of fluid pressure;
   a first valve spool means slidably disposed in said bore for controlling the distribution of fluid to the first friction torque transmitting device for the establishment of engaged and disengaged positions thereof and said first valve spool having a longitudinal bore portion; and a second valve spool means slidably disposed in said longitudinal bore portion and receiving fluid via a port in said first valve spool for selective distribution to the second friction torque transmitting device and for controlling the second friction torque transmitting device between engaged and disengaged positions.

2. A control valve assembly controlling first and second friction torque transmitting devices comprising:

a source of fluid pressure;

a valve housing having a bore portion disposed in fluid communication with said source of fluid pressure, a control passage, an exhaust passage, a first device control passage and a second device control passage;

a first valve means slidably disposed in said bore and being responsive to fluid pressure in said control passage for controlling distribution of fluid from said pressure source to said first device control passage and from said first device control passage to said exhaust passage and said first valve means having a longitudinal bore; and a second valve means slidably disposed in said longitudinal bore and being responsive to fluid pressure in said control passage for controlling distribution of fluid from said pressure source to said second device control passage only when said first valve means is directing fluid distribution from said pressure source to said first device control passage.

3. The control valve assembly defined in claim 2 wherein the first valve means includes a first spool valve and a control chamber is formed by said first spool valve and an end of the bore portion which is connected for fluid communication with said control passage, and spring means disposed for urging the first valve spool toward the end of the bore portion.

4. The control valve defined in claim 3 wherein the second valve means includes a second valve spool cooperating with one end of the longitudinal bore to provide a control chamber connected for fluid communication with the control chamber of the first valve means, and control spring means for urging the second valve spool toward the one end of the longitudinal bore.

5. A control valve assembly controlling first and second friction torque transmitting devices comprising:

a source of fluid pressure;

a source of control pressure;

a valve housing having a bore portion disposed in fluid communication with said source of fluid pressure;

a first valve spool means slidably disposed in said bore for controlling the distribution of fluid to the first friction torque transmitting device for the establishment of engaged and disengaged positions thereof and said first valve spool having a longitudinal bore portion;

a second valve spool means slidably disposed in said longitudinal bore portion and receiving fluid via a port in said first valve spool for selective distribution to the second friction torque transmitting device and for controlling the second friction torque transmitting device between engaged and disengaged positions;

a first control chamber formed between one end of the bore portion and the valve spool and being connected with said source of control pressure;

a second control chamber formed between one end of the longitudinal bore portion and said spool valve and being in fluid communication with said source of control pressure through said first control chamber; and spring means urging each spool valve to the one end of the respective bore portions, said second valve spool means being operable in response to fluid pressure from said source of control pressure to establish selective distribution of fluid to the second friction torque transmitting device regardless of the fluid distribution condition of the first valve spool.

* * * * *